United States Patent [19]

Puvogel

[11] E Re. 30,150

[45] Reissued Nov. 13, 1979

[54] INDUCTOR DRIVE MEANS

[75] Inventor: John M. Puvogel, West Alexandria, Ohio

[73] Assignee: NCR Corporation, Dayton, Ohio

[21] Appl. No.: 960,131

[22] Filed: Nov. 13, 1978

Related U.S. Patent Documents

Reissue of:

[64] Patent No.: 3,708,726
Issued: Jan. 2, 1973
Appl. No.: 168,052
Filed: Aug. 2, 1971

[51] Int. Cl.[2] ..... H01H 47/22
[52] U.S. Cl. ..... 361/152; 361/156
[58] Field of Search ..... 361/152, 156, 159

[56] References Cited

U.S. PATENT DOCUMENTS

| | | | |
|---|---|---|---|
| 2,907,929 | 10/1959 | Lawson | 361/156 |
| 3,337,748 | 8/1967 | Rusch et al. | 361/159 X |
| 3,379,946 | 4/1968 | Croymans . | |
| 3,402,334 | 9/1968 | Newton, Jr. . | |
| 3,444,447 | 5/1969 | Newell . | |
| 3,467,894 | 9/1969 | Blume | 361/156 |

FOREIGN PATENT DOCUMENTS

| | | | |
|---|---|---|---|
| 1115785 | 10/1961 | Fed. Rep. of Germany | 361/156 |
| 1288194 | 1/1969 | Fed. Rep. of Germany | 361/156 |

*Primary Examiner*—Harry E. Moose, Jr.
*Attorney, Agent, or Firm*—J. T. Cavender; Albert L. Sessler, Jr.

[57] ABSTRACT

A circuit providing a means of transferring and storing the energy from the collapsing field of a deenergized inductive load to a capacitor, and subsequently delivering this energy back to the inductive load to aid in its re-energization. A first circuit path is provided for transferring the energy from the inductive load to the capacitor, and a second circuit path is provided for transferring the energy from the capacitor to the inductive load, said second circuit path including a signal translating device, the conductivity of which is controlled by the charge on the capacitor at the time re-energization of the inductive load is initiated.

10 Claims, 2 Drawing Figures

+ $V_A$
38
10
36
34
30
28
$V_L$
16
+
−
32
14
20
18
12
22
40
26
42
$S_E$
44
24
46
50
48
52
54
56

INDUCTOR DRIVE MEANS

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to a circuit for energizing an inductive load. In this circuit, energy produced when the inductive load is deenergized is stored and applied to the inductive load at its next energization, in order to enhance the speed of such energization, and to reduce the energy required.

2. Description of the Prior Art

Energizing circuits for energizing inductive loads are well known. In U.S. Pat. No. 3,379,946, issued Apr. 23, 1968, on the application of Jacques Johannes Hendrik Croymans, a stepping motor having a single energizing winding is provided with a pulsing circuit having a single-pole double-throw switch which automatically returns to rest, and which, in first position, pulses the energizing winding and charges a capacitor, and, in second position, allows the capacitor to discharge through the energizing winding. The double pulsing allows the motor to take two steps for each switching operation.

In U.S. Pat. No. 3,402,334, issued Sept. 17, 1968, on the application of George C. Newton, Jr., an energizing circuit is shown which is useful for driving complementary coils which are alternately energized. Energy resulting from the deenergization of one coil is applied directly to a second coil for increasing the rate of current rise in this coil.

In FIGS. 7 and 8 of U.S. Pat. No. 3,444,447, issued May 13, 1969, on the application of Harold R. Newell, are shown circuit embodiments of a driving network which utilize the reverse voltage surge across one winding when deenergized to enhance magnetic field buildup in a complementary winding.

SUMMARY OF THE INVENTION

This invention relates to an inductive load energizing circuit having the capability of storing the energy from the collapsing field of a deenergized inductive load and subsequently delivering this energy back to the inductive load to aid in its re-energization. Energization of the inductive load is controlled by a switching means connected in series therewith in a first circuit path extending across a power supply. A capacitor is included in the circuit for the purpose of storing energy resulting from deenergization of the inductive load, and a second circuit path is provided, which includes the inductive load and the capacitor.

Re-energization of the inductive load is accomplished by rendering the previously-mentioned switching means conducting, which also causes the charge on the capacitor to produce a bias on the control electrode of a signal translating device included in a third circuit path which also includes the inductive load, the capacitor, and the switching device. The signal-translating device is rendered conductive by said bias on its control electrode, and enables the capacitor to discharge, thus providing supplementary energy in said third path for re-energizing the inductive load.

The inductive load energizing circuit of the present invention thus provides a means for storing the energy resulting from deenergization of an inductive load, and subsequently utilizing this energy in the re-energization of the inductive load. Advantages provided by this novel circuit over a conventional energizing circuit include a lower power input requirement for rapid energization of an inductive load; reduced power dissipation in the switching or regulating component; and reduced time required for energization.

DETAILED DESCRIPTION

Figure 1:
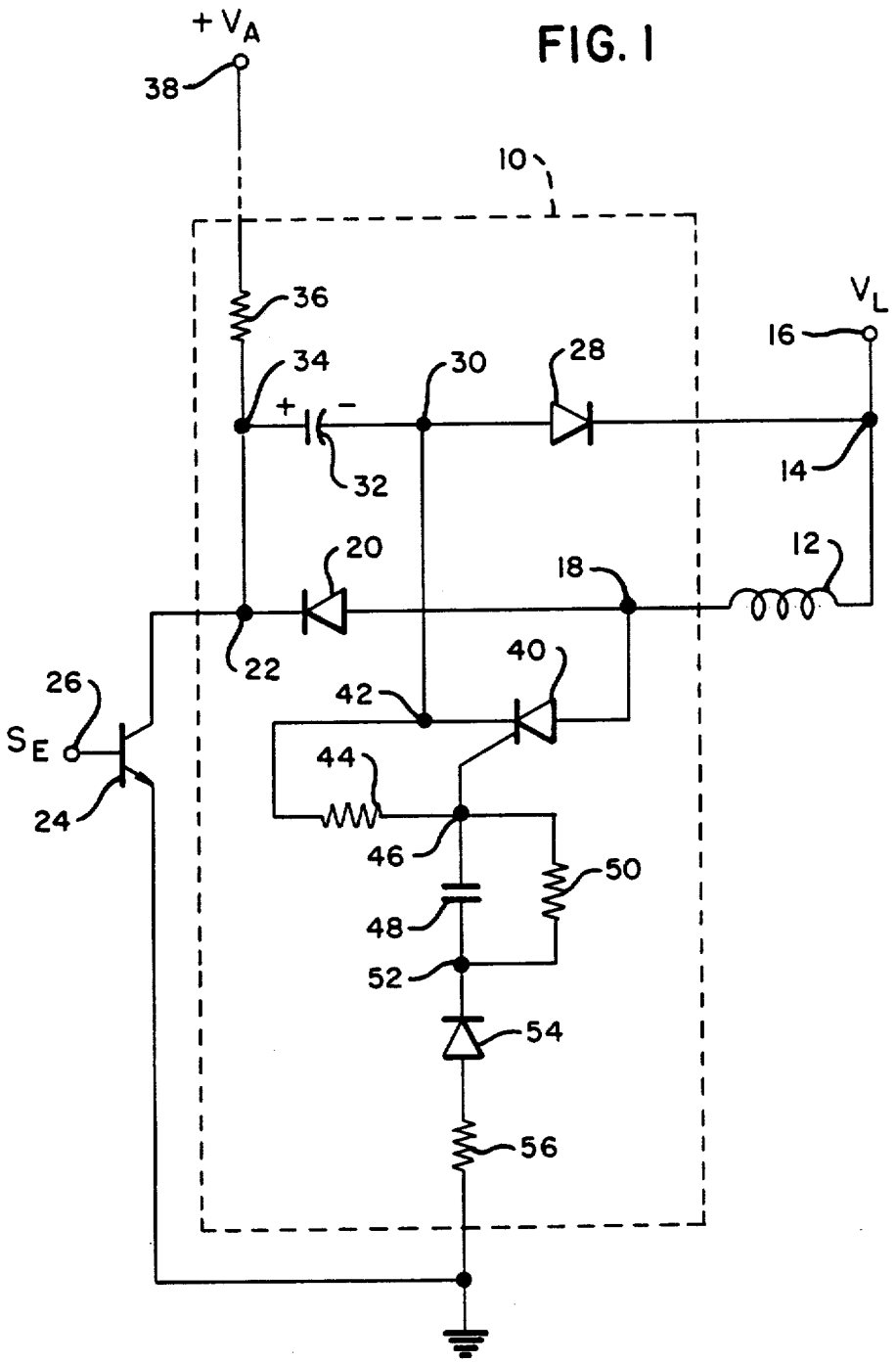
FIG. 1 is a diagram of an inductor drive circuit embodying the present invention.

In the circuit of FIG. 1, an inductive load 12 is connected at one end over a point 14 to a terminal 16, to which a positive source of potential $V_L$ is connected. The inductive load 12 may comprise one of the windings of a stepping motor, or may comprise any other appropriate inductive load, such as a solenoid, for example. At its other end, the inductive load 12 is connected over a point 18, a diode 20, which may be of the type 341, manufactured by Westinghouse Electric Corporation, of Pittsburgh, Pennsylvania, United States of America, and a point 22 to an energizing switch of any suitable type for controlling energization of the inductive load. In the illustrated embodiment, the point 22 is connected to the collector of an NPN-type transistor 24, which may be of type 2N3771, manufactured by RCA Corporation, of New York, New York, United States of America. The emitter of the transistor 24 is connected to a base reference potential shown in FIG. 1 as ground, and the base of said transistor is connected to a terminal 26, to which may be applied a signal $S_E$ for energizing the inductive load 12, as will subsequently be described. In FIG. 1, it may be noted that the actual inductor drive circuitry is shown within the line 10.

From the point 14, a circuit branch extends over a diode 28, which may be of type 341 manufactured by Westinghouse Electric Corporation, a point 30, and a 15-microfarad capacitor 32 to a point 34, from which one branch connects the point 34 to the point 22, while a second branch extends over a 4,300 ohm resistor 36 to a terminal 38, to which is applied a positive source of potential $V_A$, which in the illustrated embodiment is 42 volts.

The point 18 is connected to the anode of a signal translating device 40, which may be a silicon controlled rectifier of type C20B, manufactured by General Electric Company, of New York, New York, United States of America. The cathode of said controlled rectifier is connected to a point 42, from which one branch extends to the point 30, and another branch extends over a 470-ohm resistor 44 to a point 46, from which one circuit branch extends to the gate of the controlled rectifier 40. A parallel combination of a 0.022-microfarad capacitor 48 and a 30,000-ohm resistor 50 extends between the point 46 and a point 52, from which the circuit continues over a diode 54, which may be of type IN462 manufactured by Sylvania Electric Products Inc., of New York, New York, United States of America, and an 820-ohm resistor 56 to a connection to a base reference potential shown in FIG. 1 as ground.

The operation of the circuit of FIG. 1 will now be described with reference to the wave forms shown in FIG. 2. These wave forms illustrate transient conditions of voltage and current with respect to time at various points in the circuit of FIG. 1, and offer a comparison of the current in the inductive load using the circuit of the present invention, as compared to the current in the inductive load using a conventional circuit in which the counter-EMF energy is not capacitively stored and then used in re-energizing the load.

Initial energization of the inductive load 12 is accomplished by the application of a suitable energizing signal $S_E$ to the terminal 26, which is associated with the base of the transistor 24, thus causing said transistor to conduct, and completing a circuit extending from the terminal 16 over the point 14, the inductive load 12, the point 18, the diode 20, the point 22, and the transistor 24, to ground. When the signal $S_E$ is terminated, the transistor 24 ceases to conduct, thus interrupting the energizing circuit. The resulting counter-EMF from the inductive load 12 causes the capacitor 32 to charge, thus transferring the inductive field energy to capacitor charge energy. The current path during this transfer of energy extends from the inductive load 12 over the point 18, the diode 20, the points 22 and 34, the capacitor 32, the point 30, the diode 28, and back to the inductive load 12. Since the voltage $V_A$ at the terminal 38 is equal to the charged capacitor voltage, and since the transistor 24 is not conducting, the capacitor 32 has no discharge path.

At the time of the next energizing signal $S_E$, the transistor 24 is once more rendered conducting, and the positive terminal of the capacitor 32 is grounded. As a consequence, the negative terminal of the capacitor 32 is driven below ground, thus causing a negative pulse to be applied to the cathode of the controlled rectifier 40, causing a gate current to commence flowing, which in turn causes said controlled rectifier to commence conducting. A current path is thus established, extending from the terminal 16 over the point 14, the inductive load 12, the point 18, the controlled rectifier 40, the points 42 and 30, the capacitor 32, the points 34 and 22, and the transistor 24, to ground. Current flow in this path continues, discharging the capacitor 32 to a point at which the holding current through the controlled rectifier 40 falls off sufficiently to terminate conduction therethrough. The energizing circuit then extends from the terminal 16 over the point 14, the inductive load 12, the diode 20, the point 22, and the transistor 24 to ground, until such time as the energizing signal $S_E$ is terminated, cutting off the transistor 24.

For given circuit parameters, the size of the capacitor 32 can be determined by means of the following equation:

$$C=(LI_L^2/V_C^2)$$

in which

C = capacitance of capacitor 32

$V_C = V_{transistor} - V_{supply}$ $I_L$ = current in inductive load 12

L = inductance of inductive load 12.

The above equation is derived from the two well-known energy equations:

$$E=(LI^2/2) \text{ and } E=(V^2/2)$$

These equations can be set equal to each other for purposes of deriving the equation for capacitance, since the capacitor 32 stores most of the energy which is given up by the collapsing field of the inductive load 12.

The time required for charging the capacitor 32 and deenergizing the inductive load 12 can be [estimated by] *derived from* the following equation, assuming no resistance in the diodes 20 and 28, the capacitor 32, and the inductive load 12:

$$W_o = [(1/LC)] (1/\sqrt{LC}) \text{ where:}$$

$W_o$ = [time] *angular velocity* in radians per second

L = inductance of inductive load 12

Figure 2:
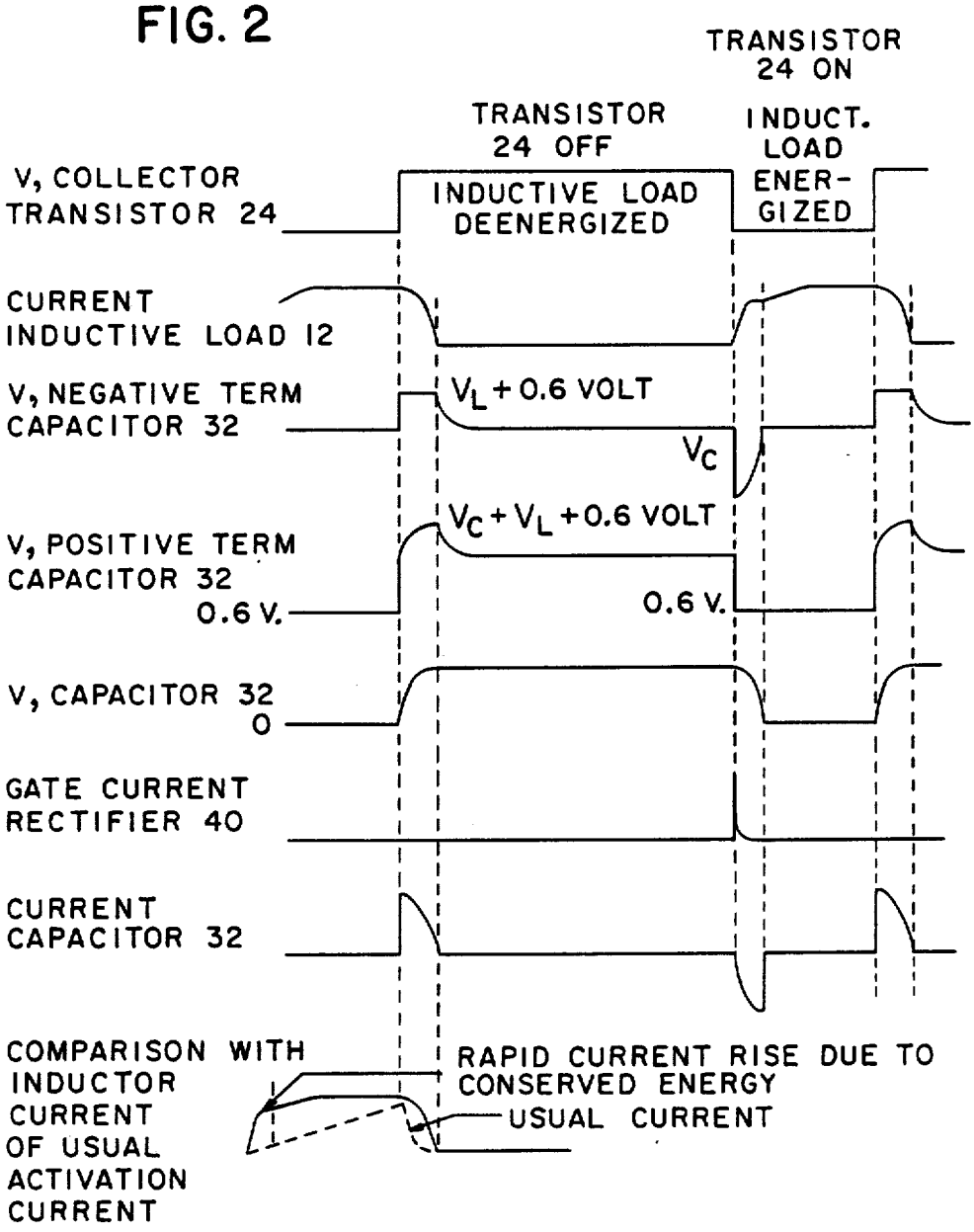
FIG. 2 shows a series of wave forms associated with the operation of the circuit of FIG. 1.

C = capacitance of capacitor 32 and where the inductive load current takes the form of a second quarter cycle sine wave and the capacitor voltage takes the form of a first quarter cycle sine wave as shown in FIG. 2.

The same equation may be used to estimate the time required for delivering the stored energy from the capacitor 32 to the inductive load 12 during the energizing cycle, assuming no resistance in the controlled rectifier 40, the capacitor 32, the inductive load 12, and the transistor 24. In this instance, the inductive load current takes the form of a first quarter cycle sine wave and the capacitor voltage takes the form of a second quarter cycle sine wave, as shown in FIG. 2.

The diode 20 must have a voltage rating in excess of the voltage level stored in the capacitor 32 plus the load supply voltage $V_L$, and must have a current rating dependent upon the duty cycle and current requirement of the inductive load 12. However, the diodes 28 and 40 can be current surge rated, since they function only during periods of energy transfer between the inductive load 12 and the capacitor 32.

The resistor 44 and the diode 54 are used in the gating circuit for the controlled rectifier 40 (which also includes the capacitor 48, the resistor 50, and the resistor 56), in order that the gate-to-cathode junction of the rectifier 40 is not reversed when the cathode is biased at the $V_L$ level during charging of the capacitor 32. The resistor 56 and the capacitor 48 are chosen to supply an exponentially decaying current pulse to the gate of the rectifier 40 when the negative terminal of the capacitor 32 is driven negative from ground at the start of the inductive load energization. The maximum gate current equals the stored capacitor voltage divided by the resistance of the resistor 56.

Where very long periods exist between inductive load energizing pulses, small leakages in the diode 20 or in the transistor 24 may cause the stored voltage on the capacitor 32 to be reduced. To maintain the stored energy level on the capacitor 32, a trickle charge may be applied to the positive terminal of the capacitor 32 through the resistor 36 from the potential supply $V_A$ applied to the terminal 38. An advantage of this charging technique is that the capacitor 32 can be charged after equipment utilizing the circuit of the present invention is turned on, so as to aid in the first energization of the inductive load 12.

What is claimed is:

1. In combination with an inductive load having a two-terminal winding, a driving circuit for energizing said winding comprising, in combination, a direct current voltage supply having two terminals;

means connecting a first one of the terminals of the winding to a first one of the terminals of the direct current voltage supply;

energy storage means having two terminals;

means including a unidirectional conducting device connecting a first one of the terminals of the energy storage means to said first terminal of said winding;

means including a unidirectional conducting device connecting the second of the terminals of the winding to the second terminal of the energy storage means;

switching means for controlling the state of energization of the winding, said switching means having a first terminal connected to said second terminal of said energy storage means and a second terminal connected to the second terminal of said direct current voltage supply;

signal translating means having a first terminal connected to said second terminal of said winding, a second terminal connected to said first terminal of said energy storage means, and a control gate;

means for connecting said control gate to said second terminal of said voltage supply; and means for connecting said control gate to said first terminal of said energy storage means; whereby deenergization of said winding under control of said switching means causes energy to be stored in said energy storage means, and whereby during subsequent re-energization of said winding under control of said switching means the energy stored in said energy storage means is applied to said winding through said signal translating means, which is rendered conducting at such time in response to the potential level at the first terminal of the energy storage means.

2. The combination of claim 1, also including means for applying a source of potential to said second terminal of the energy storage means.

3. The combination of claim 1 wherein the energy storage means comprises a capacitor.

4. The combination of claim 1 wherein the signal translating means comprises a silicon controlled rectifier.

5. The combination of claim 1 wherein the means for connecting the control gate to the second terminal of the voltage supply includes a series combination of a resistance, a unidirectional conducting device, and a parallel resistance-capacitance combination.

6. The combination of claim 1 wherein the means for connecting the control gate to the first terminal of the energy storage means includes a resistance.

7. Drive circuitry for controlling the energization of an inductive load comprising, in combination, switching means for controlling the energization and deenergization of the inductive load;

energy storage means capable of storing the energy produced by deenergization of the inductive load;

first circuit means to apply the energy produced by deenergization of the inductive load to the energy storage means;

signal translating means having a first terminal connected to one side of the load, a second terminal connected to one side of the energy storage means, and a control gate connected to a reference potential;

second circuit means including the second terminal and control gate of the signal translating means, whereby the conductivity of the signal translating means is controlled by the energy storage condition of the energy storage means; and third circuit means associated with the switching means, the energy storage means, the signal translating means, and the inductive load for applying the energy stored in the energy storage means to the inductive load to aid in the re-energization thereof when the switching means is operated to energize the inductive load.

8. The drive circuitry of claim 7 in which the energy storage means comprises a capacitor.

9. The drive circuitry of claim 7 in which charging means are provided for maintaining the energy storage means in a fully charged condition during the period when the inductive load is deenergized.

10. The drive circuitry of claim 7 in which the signal translating means is a silicon controlled rectifier.

* * * * *